United States Patent
Miller

(10) Patent No.: US 8,409,513 B2
(45) Date of Patent: Apr. 2, 2013

(54) APPARATUS AND METHOD FOR THE PRODUCTION OF TRISILYLAMINE

(75) Inventor: Gary D. Miller, Annandale, NJ (US)

(73) Assignee: Voltaix, Inc., Branchburg, NJ (US)

( * ) Notice: Subject to any disclaimer, the term of this patent is extended or adjusted under 35 U.S.C. 154(b) by 287 days.

(21) Appl. No.: 12/792,023

(22) Filed: Jun. 2, 2010

(65) Prior Publication Data

US 2010/0310443 A1    Dec. 9, 2010

Related U.S. Application Data

(60) Provisional application No. 61/184,148, filed on Jun. 4, 2009.

(51) Int. Cl.
- *B01J 19/02* (2006.01)
- *B01J 19/24* (2006.01)
- *B01J 19/26* (2006.01)

(52) U.S. Cl. ......... 422/129; 422/198; 422/239; 422/241

(58) Field of Classification Search .................. 422/129, 422/198, 199, 202, 212, 239, 240, 241
See application file for complete search history.

(56) References Cited

U.S. PATENT DOCUMENTS

| | | | | |
|---|---|---|---|---|
| 3,068,113 A * | 12/1962 | Strain et al. | ................. | 106/437 |
| 4,036,653 A * | 7/1977 | Jacobson | ................. | 423/344 |
| 4,855,112 A * | 8/1989 | Adcock | ................. | 422/186.23 |
| 5,302,366 A | 4/1994 | Schuette et al. | | |
| 7,018,589 B1 | 3/2006 | Erden et al. | | |
| 2008/0206122 A1 | 8/2008 | Keller | | |

OTHER PUBLICATIONS

The International Search Report and Written Opinion by the International Searching Authority, mailed on Jul. 29, 2010, in the PCT application No. PCT/US10/37025.

David Beach, "Infrared and mass spectroscopic study of the reaction of silyl iodide and ammonia. Infrared spectrum of silylamine," Inorg. Chem., 1992, 31 (20), pp. 4174-4177.

\* cited by examiner

*Primary Examiner* — Jennifer A Leung

(57) ABSTRACT

There is described an apparatus, a tubular laminar flow, plug flow reactor, for making silylamines and particularly trisilylamine (TSA) in high yields from ammonia gas and a monohalosilane gas. The apparatus can be a tubular flow reactor comprising a first portion of the reactor defining a gas entry zone, a second portion of the reactor defining a reaction zone and a third portion of the reactor defining a separation zone, the reaction zone providing a reactant contacting region. Trisilylamine can be recovered in the separation zone in a cold trap collection vessel.

30 Claims, 9 Drawing Sheets

APPARATUS AND METHOD FOR THE PRODUCTION OF TRISILYLAMINE

CROSS-REFERENCE TO RELATED APPLICATIONS

This application claims priority of U.S. Provisional Patent Application Ser. No. 61/184,148, entitled "Apparatus And Method For The Production Of Trisilylamine," filed on Jun. 4, 2009, which is incorporated by reference herein.

FIELD OF THE INVENTION

This invention relates to a reactor for synthesizing silylamines and particularly disilylamine and trisilylamine.

BACKGROUND OF THE INVENTION

Trisilylamine is a useful molecule for use in semiconductor manufacturing. It is stable once produced, but is susceptible to decomposition from excessive reaction conditions and synthesis by products. Dussarrat, et al. U.S. Pat. No. 7,192,626 demonstrated that a stable Silicon nitride film is formed on a substrate by feeding trisilylamine and ammonia into a CVD reaction chamber that contains a substrate.

Wells and Schaeffer (*J. Am. Chem. Soc.*, 88:1, 37 (1996)) discuss a batch method of preparing trisilylamine by the reaction silyl chloride with ammonia. They report the yields of trisilylamine varied depending on the method of mixing and the purity of the reactants. Wells and Schaeffer allowed the reactants to mix in the gas phase by introducing the ammonia from below into a 1 liter bulb containing silylchloride. After introducing the gaseous ammonia very slowly, the reaction bulb and contents were allowed to remain at room temperature for 15 min. Copious amounts of white solid were precipitated on the walls of the bulb as soon as mixing occurred. The product was removed and the trisilylamine recovered. The process yield was about 77% of the theoretical amount of trisilylamine.

In the batch reactor process, all of monohalosilane is charged into the reactor vessel. Batch size is limited by this initial charge and the size of the vessel. Ammonia gas is then very slowly added into the flask. Reaction conditions will vary in the vessel depending on the initial concentrations of monohalosilane and ammonia and the efficiency of turbulent mixing in the vessel. The mixing is affected by vessel size as well as the efficiency of the mechanical mixing device if one is employed. In addition, during the batch process the silylamines produced are in contact with ammonium halide which is also a product of the reaction. Ammonium halides such as ammonium chloride are catalysts and will disproportionate TSA into silane and other degradation products thereby lowering the yield of TSA. The reaction of silyl halide and ammonia produces heat thereby exacerbating the degradation conditions in a closed reactor vessel.

SUMMARY OF THE INVENTION

The invention is directed to a tubular flow reactor and a process for the synthesis of silylamines which have been found to produce high volumes, at high yield efficiencies of silylamines. The reactor has a unique combination of characteristics found in plug flow and laminar flow devices. This combination of properties results in a high volume high efficiency synthesis of silylamines. The primary silylamine of interest is trisilylamine. Production of disilylamines in commercial quantities is also within the scope of the present invention.

The present invention is directed to a tubular laminar flow, plug flow gas reactor for synthesis of silylamine comprising:
(a) a first portion of the tubular laminar flow reactor defining a gas entry zone, a second portion of the tubular laminar flow reactor defining a reaction zone and a third portion of the tubular laminar flow reactor defining a separation zone, the reaction zone providing a reactant contacting region;
(b) one or more conduits positioned substantially parallel to the central, longitudinal axis of the flow reactor extending into the gas entry zone and terminating in the reaction zone, the one or more conduits directing a laminar flow of a first reactant gas into the reaction zone;
(c) one or more gas entry conduits positioned upstream of the one or more conduits directing a flow of a second reactant gas into the gas entry zone to form a flow of the second reactant gas which passes into the reaction zone;
(d) a reaction zone wherein the first reactant gas and the second reactant gas come in contact with one another forming a reactant stream;
(e) a gas exit port directing the flow of the reactant stream from the reaction zone to a collection zone;
(f) a collection zone comprising a collector removing reaction product from the reactant stream.

The internal reactor pressure is maintained at about one atmosphere or less. Preferably the reactor is has an internal pressure of about 100 torr to about 400 torr.

The present invention is also directed to a process for preparing silylamines in a tubular laminar flow, plug flow gas reactor, comprising:
(a) directing a flow of a first reactant gas into a reaction zone region of a tube reactor;
b) passing a second reactant gas through a conduit into the reaction zone region of the tube reactor containing the first reactant gas thereby forming a laminar flow and plug flow reaction stream wherein the first reactant gas and the second reactant gas react to form silylamines;
(c) passing the reaction stream containing silylamines into a collection zone of the flow tube reactor;
(d) separating the silylamines from the reaction stream; and
(e) maintaining the reactor at a pressure of about one atmosphere or less.
Preferably maintaining the reactor internal pressure at about 100 torr to about 400 torr.

The complete reaction is:

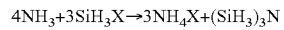

It is believed that the silylamines of the present invention are produced in accord with the following reaction sequence:

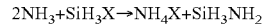

X=Cl, F, Br, I

BRIEF DESCRIPTION OF THE DRAWINGS

Specific embodiments of the invention are described below with reference to the following.

DETAILED DESCRIPTION OF THE INVENTION

Figure 1:
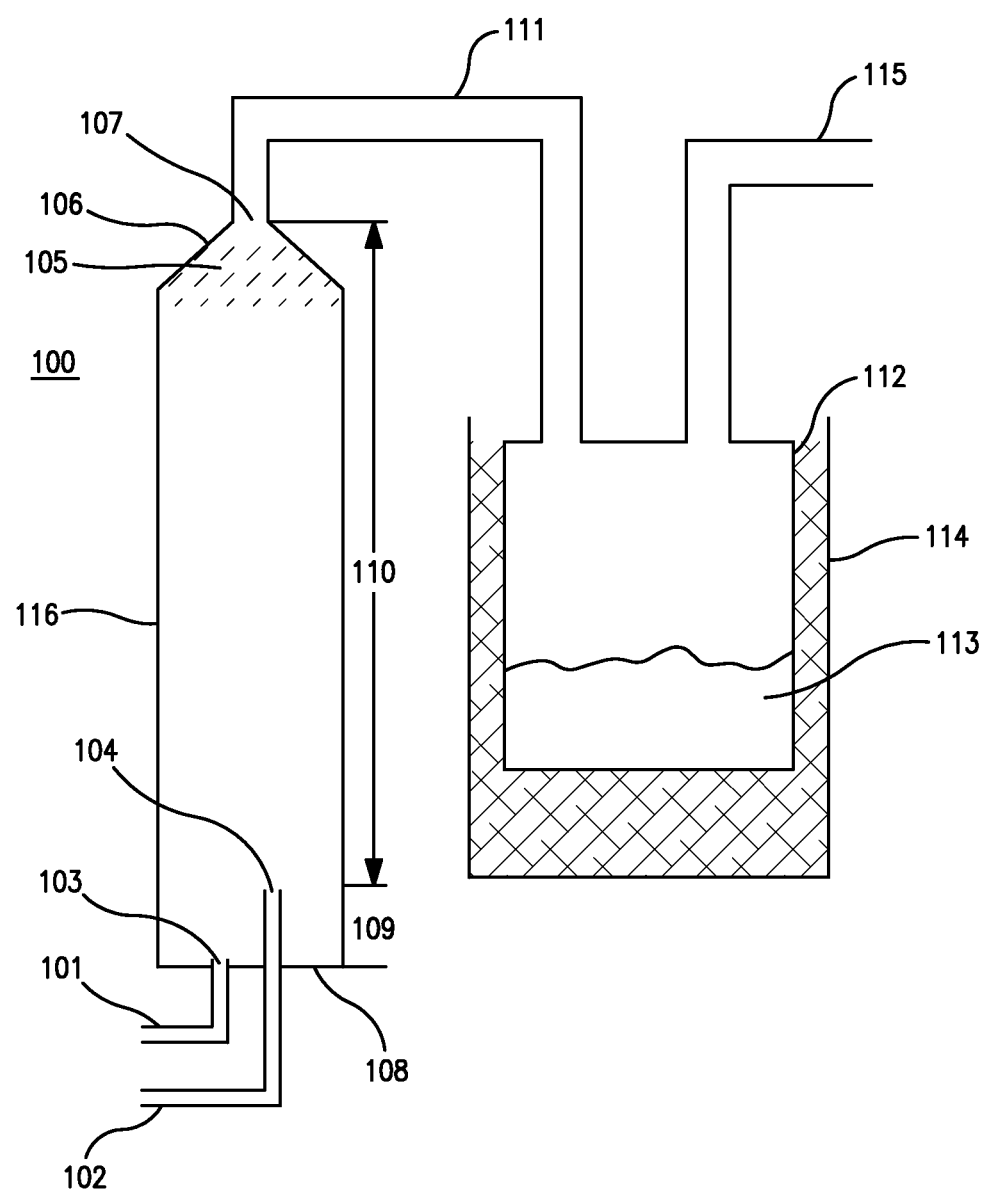
FIG. 1 is a cross section view of the tubular reactor and a collection vessel.

The invention relates to a flow reactor and a process that promotes reaction conditions suitable for a high volume high efficiency synthesis of silylamines. The primary silylamine of interest is trisilylamine. Production of disilylamine in commercial quantities is also within the scope of the present invention.

The reactants are contacted in a manner that optimizes reaction conditions thereby avoiding excessive reaction conditions which can result in product decomposition and the formation of synthesis byproducts, notably silane and silazane polymers. For example, the tubular reactor causes the ammonium halide product of the reaction to stay in the tube while the gaseous products such as disilylamine and trisilylamine flow out of the reactor and are collected in a cold trap vessel substantially free of ammonium halide. The ammonium halide byproduct of the synthesis is crystalline under reaction conditions, so it generally deposits on the side wall of the reactor or falls to the bottom of the reactor while the gaseous products continue to travel up the reactor, that is down stream, and out of the reactor. The reactor tube may be positioned horizontal or vertical with vertical positioning being preferred.

In the present process, the reaction stream is initially not homogeneous and is gradually heated within the reaction zone as the reaction products form as the reaction is exothermic. At first, as the reactant gases enter the reaction zone, the initial flow is laminar. The reaction rate is controlled by the rate of diffusion across the barrier between the first reactant entering from the conduit at the beginning of the reaction zone and the second reactant which entered the reactor from the conduit in the gas entry zone. As the reaction occurs, particulate ammonium halide, gaseous silylamines and heat are produced which combine to cause mixing of reactants to occur. During this reaction caused mixing process, the reacting gases continue to move along the length of the reaction zone in a plug flow manner to the collection zone in a unilateral rather than a turbulent flow. The ammonium halides produced during the reaction fall out of the gas stream as they are formed. An optional filter at the down stream end of the reactor or optionally in the tubing connecting the reactor to the collection vessel removes all residual fine particulates from the gas stream as the gases leave the reactor reaction zone. Removing ammonium halide from the product stream eliminates the catalytic degradation of TSA by ammonium halide in the collection vessel. As the mixing reactants progress through the reaction zone, the concentrations of both of the reactant gases decreases thereby avoiding detrimental side reactions from occurring as the result of the formation of a large excess of one reactant coming in contact with the other reactant.

In contrast, in a batch reactor, the reactant entering the reactor will have the same concentration at the beginning of the batch process as at the end of the batch process. However, the concentration of reactant initially charged into the batch reactor will continually drop as the reaction continues. The resulting localized concentration inequities of the reactants may cause detrimental side reactions to occur causing low yields and making product purification more difficult.

Referring to the drawings, in FIG. 1 there is a flow reactor 100 vertically disposed and having a generally tubular configuration. A flow reactor can provide continuous production. The reaction zone 110 commences down stream of the opening 104 of the second conduit 102, which is positioned in the upstream inlet zone 109 of the flow reactor and substantially parallel to the central longitudinal axis of the flow reactor, and continues to the reaction zone exit 106 where the gaseous products flow into the separation zone through opening 107 into tube 111 into the collection vessel 112 which is sitting in a cold bath 114. The silylamine reaction products 113 are collected in the collection vessel 112. The downstream end of the reaction zone 110 may optionally contain a filter 105 for the removal of particulates such as ammonium halide from the gas stream. Optional filter 105 may be any non-reactive filter media. Typical filter media useful in the present invention include and are not limited to glass frits, metal frits, glass wool, gas permeable membranes and the like. A preferred type of filter useful in the present invention is the GasShield® POU filters, all metal filters for removal of particulates from a gas stream. GasShield filters are available from the Mott Corporation, Farmington, Conn. A GasShield® POU filter and similar filters would be placed after the reactor exit 107 and before the collection vessel 112. Non-reactive filter media is defined as a filter media that does not interact with the carrier gases, reactants, reaction products including the silylamine products of the reaction thereby consuming a portion of the reactants or silylamine products reducing yield and/or causing the final product to be contaminated with impurities caused by a chemical reaction between the filter media and the carrier gases, reactants or products of the reaction.

Figure 2:
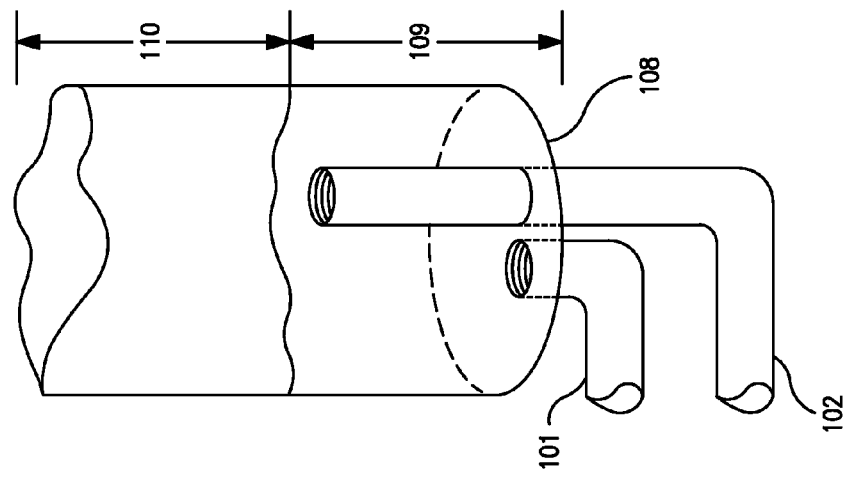
FIG. 2 is a cross section view of the gas entry zone and the reaction zone.

FIG. 2 illustrates an embodiment of the present tubular flow reactor wherein the inlet conduit 101 enters the inlet zone at the end 108 of the reactor tube. Inlet conduit 102 is positioned to pass through the upstream end 108 of the reactor tube and extend into the reactor tube. The internal end of conduit 102 is the point at which the reaction zone 110 of the tubular reactor begins and the inlet zone 109 ends. The conduit 102 is substantially parallel to the central longitudinal axis of the flow reactor.

Flow rates of the gases passing through the reactor will depend on the diameter of the reactor as well as the number of inlet conduits used and the internal pressure of the reactor during operation and the length of the reactor. Optimal flow rates for a given reactor configuration may be determined by determining the percent of theoretical yield for a series of synthesis runs with increasing flow rates. Both reactant gases enter the reactor through conduits. The conduits may enter the reactor tube through the side wall of the reactor or through the base.

The reactor is run at reduced pressure to assure that the reaction products, disilylamine and trisilylamine remain in the gas state until collected in the cold collection vessel. The reactor may be operated at ambient pressure if the reactor and exit conduits are heated sufficiently to maintain the reaction products, disilylamine and trisilylamine, in the gas state until collected in the cold collector vessel. The boiling point of trisilylamine is 52 degrees Celsius.

Figure 3:
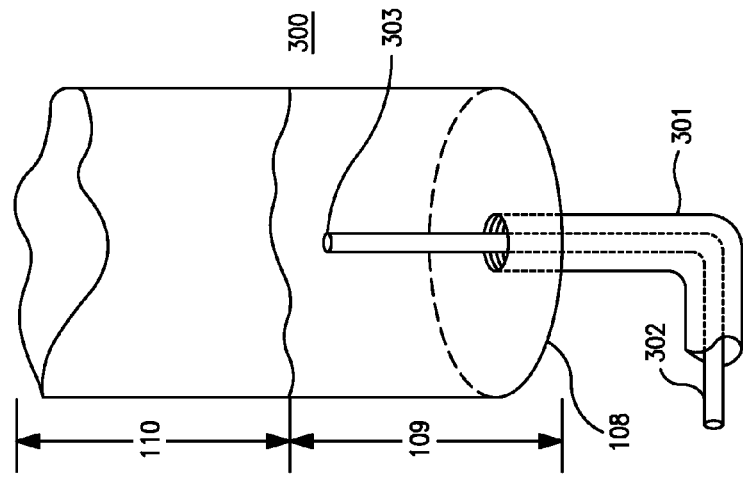
FIG. 3 is a cross section view of the gas entry zone and the reaction zone.

FIG. 3 illustrates an embodiment of the present tubular flow reactor wherein the inlet conduit 301 enters the inlet zone at the upstream end 108 of the reactor tube. Inlet conduit 302 is positioned to pass into and through conduit 301 through the upstream end of the reactor tube 108 and extend into the reactor tube 300. The internal end 303 of conduit 302 is the point at which the reaction zone 110 of the tubular reactor begins and the inlet zone 109 ends. The conduit 302 is substantially parallel to the central longitudinal axis of the flow reactor. Conduits 301 and 302 are preferably concentric.

Figure 4:
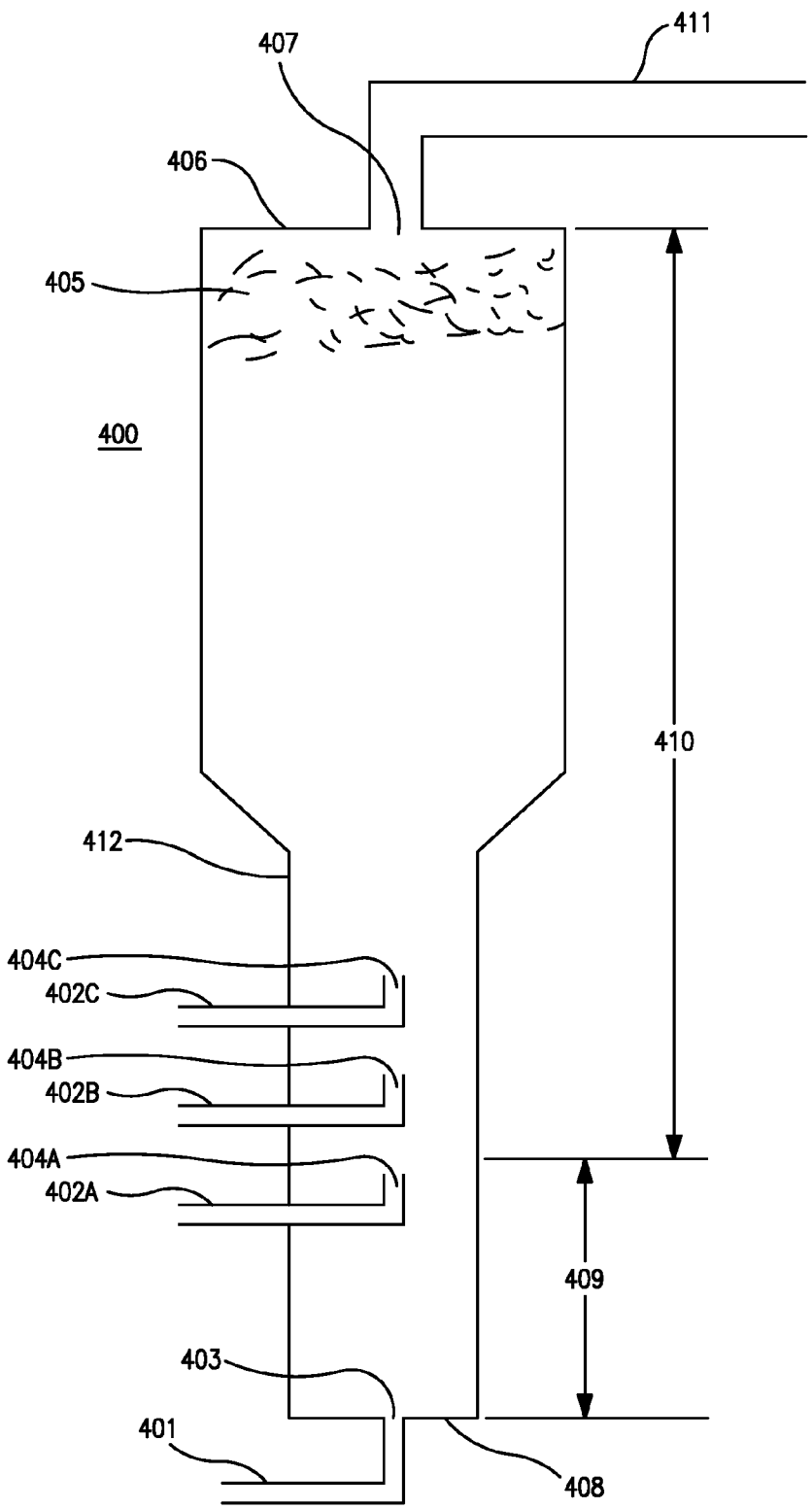
FIG. 4 is a cross section view of the tubular reactor with multiple gas entry conduits.

FIG. 4 illustrates an embodiment of the tubular flow reactor wherein the inlet conduit 401 enters the inlet zone at the upstream end 408 of the tube reactor 400. Inlet conduits 402 A, B and C enter the reactor through the side wall of the reactor and have corresponding openings 404 A, B and C. The three conduit outlets 404 A, B and C also called nozzles are positioned so that the reactant outlets are substantially parallel to the central longitudinal axis of the flow reactor.

The reactant gas entering through each of conduits 402 A, B and C may be the same reactant gas or different reactant gases or different concentrations of reactant gases or different flow rates of the reactant gases. The reaction zone 410 has a wider diameter commencing down stream of the conduit opening 404 A. The wider diameter of the tube reactor may commence at any point downstream of the inlet zone. The gaseous reaction products flow through reaction zone 410 through optional filter 405 into the separation zone through tube 411. The filter 405 removes particulate ammonium halide, which forms during the reaction, from the gas stream. Optional filter 405 may be any non-reactive filter media. Typical filter media useful in the present invention include and not limited to glass frits, metal frits, glass wool, gas permeable membranes and the like. Non-reactive filter media is a filter media that does not interact with the carrier gases, reactants or silylamine products of the reaction thereby consuming a portion of the reactants or silylamine products reducing yield and/or causing the final product to be contaminated with impurities caused by a chemical reaction between the filter media and the carrier gases, reactants or products of the reaction. The filter may be placed in the down stream end of the reactor tube or may be placed outside of the reactor in the exit conduit 411. A preferred type of filter useful in the present invention is the GasShield® POU filter.

Figure 5:
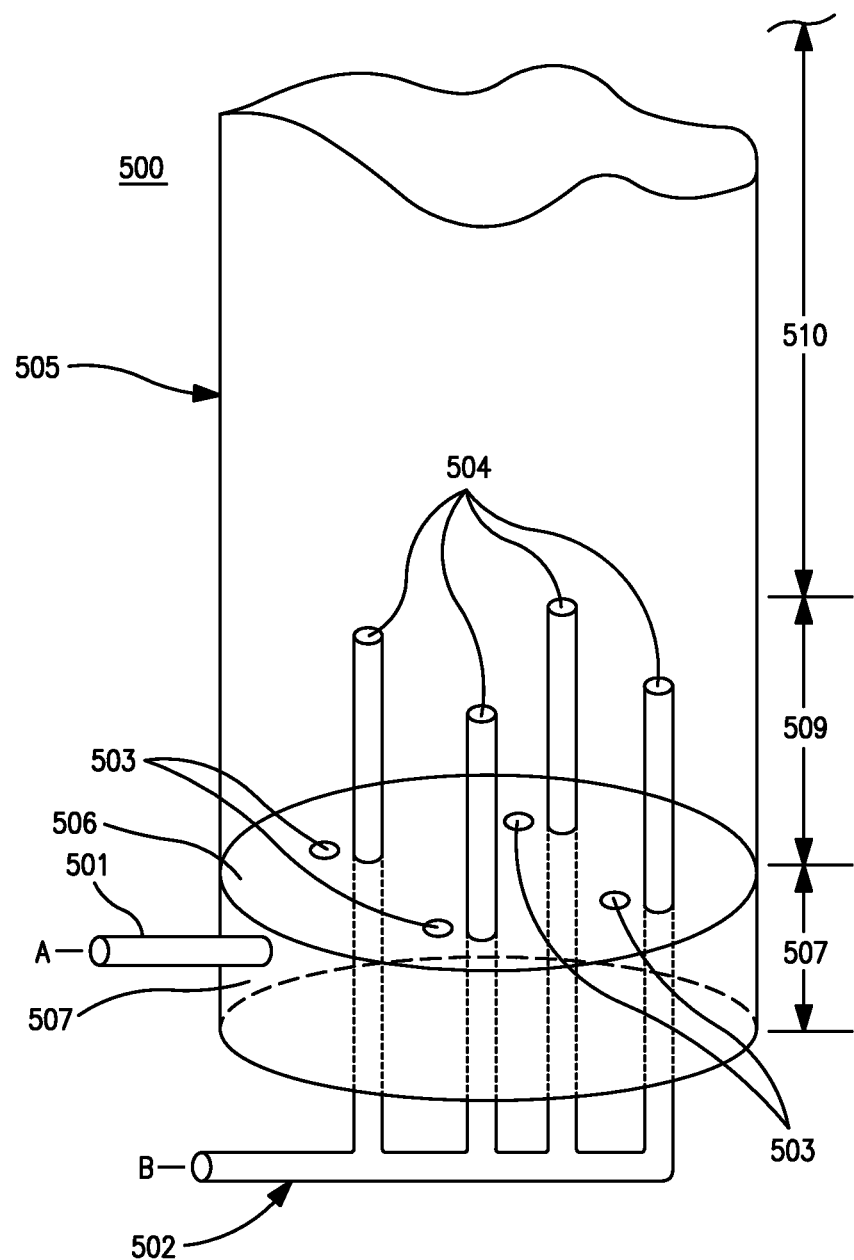
FIG. 5 is a cross section view of the gas entry zone with multiple gas entry conduits and the reaction zone.

FIG. 5 illustrates an embodiment of the inlet portion of present tubular flow reactor invention wherein the inlet conduit 501 enters the tubular reactor through the side wall 505. The first reactant is delivered through conduit 501 into a chamber 507 at the upstream end of the reactor 500. Holes 503 in wall 506 which separates chamber 507 from the remainder of the reactor allow the first reactant to pass into the entry zone 509. Second conduit 502 with openings 504 which are positioned down stream of holes 503 and are substantially parallel to the central longitudinal axis of the flow reactor.

The diameter of the reactor tube is selected based on the amount of product to be made per hour. Larger tubes may produce more product. Shape of the reactor tube is not critical. Cylindrical reactors are preferred and are easier and less expensive to fabricate. Non-limiting examples of cross section tube shapes useful in the present invention include circular, oval, elliptical, square and rectangular. Reactor tubes may be made out of materials that do not react with the reactants or products of the synthesis of silylamines. Non-limiting examples of reactor materials are steel, glass, & polymers such as Teflon (tetrafluoroethylene) & Kel-F (polychlorotrifluoroethylene).

Figure 6:
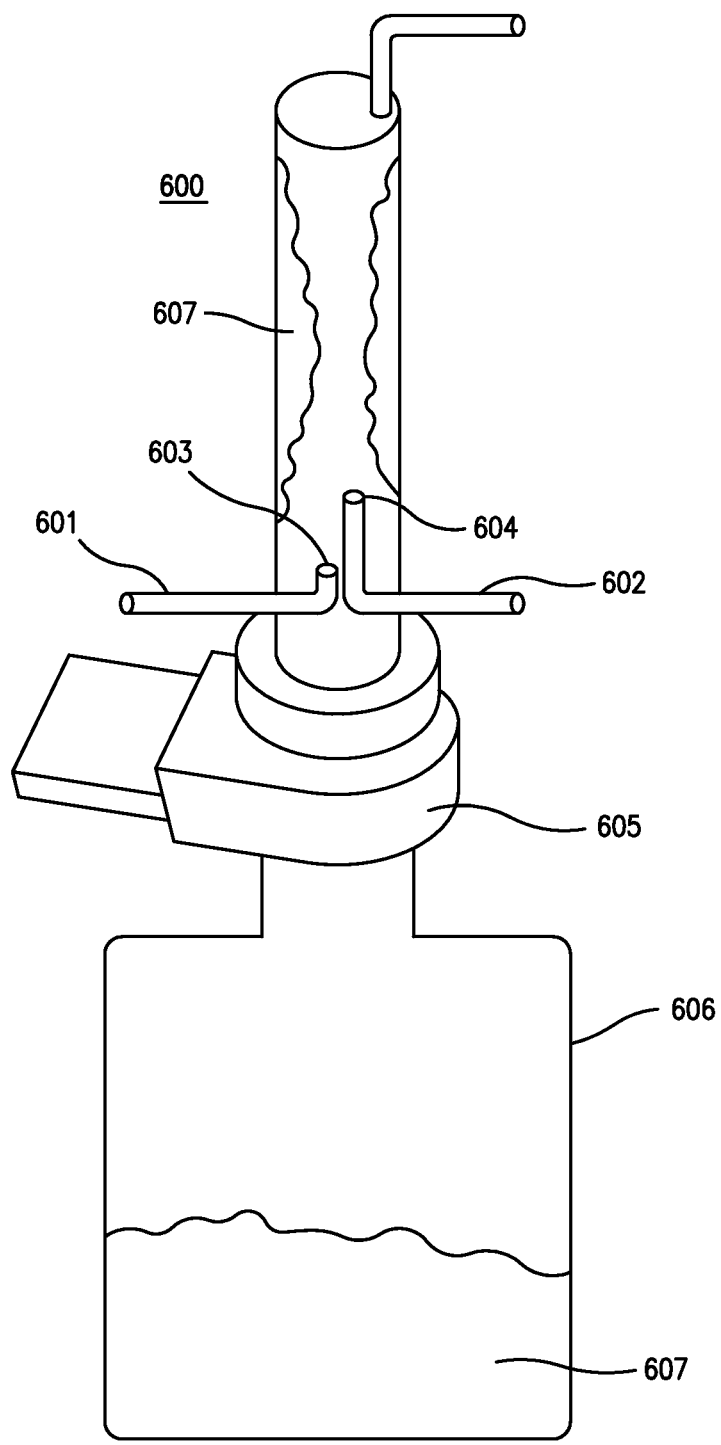
FIG. 6 is a view of the solids accumulator, load lock gate valve, entry zone and reaction zone.

FIG. 6 illustrates an embodiment of the inlet portion of present tubular flow reactor with the reactor tube being substantially vertical further comprising a solids accumulator vessel 606 for collecting particulate ammonium halide 607 reaction product. During the course of the reaction to form silylamines, ammonium halide is formed. The ammonium halide 607 is crystalline and has been observed to adhere to the sidewalls of the reaction zone and collect on the bottom of the reactor. The reservoir 606 is connected to the upstream base (bottom) of the reactor either directly or with a gate valve 605. During operation of the reactor with a gate valve, the gate valve may be opened or closed. Ammonium halide 607 will accumulate at the bottom of the reactor, in reservoir 606, during operation of the reactor. Accumulation of the ammonium halide in the reservoir will permit longer operation of the reactor between cleanings. The accumulated ammonium halide is removed from the reactor between runs to avoid clogging.

Figure 7:
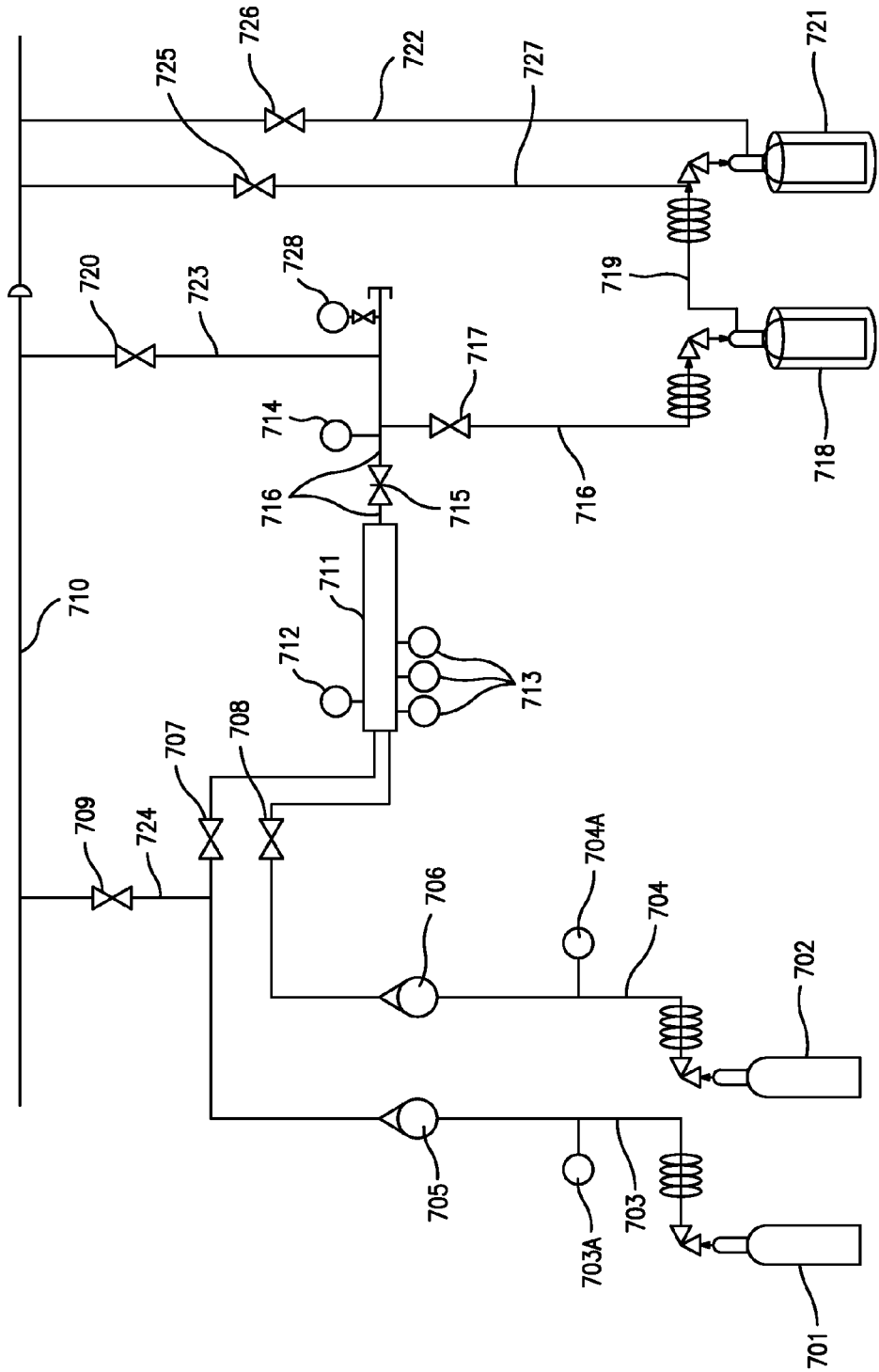
FIG. 7 is a simplified schematic diagram of a flow reactor of the invention.

FIG. 7 is a flow diagram of the flow through reactor set to produce silylamines from ammonia gas and a monohalosilane. Ammonia gas in tank 701 is fed through conduit 703 to flow controller 705 through valve 707 into the upstream end of rector 711. The monohalosilane in tank 702 is fed through conduit 704 to flow controller 706 through valve 708 into the upstream end of reactor 711. The silylamine product leaves the reactor in conduit 716 through valves 715 and 717 into the cold trap collection vessel 718. The silylamines are captured in cold trap 718. The effluent from collection vessel 718 can be vented through conduits 719 and 727. Optionally, the effluent of collection vessel 718 may be passed into collection vessel 721. Vessel 721 is a cold trap maintained a temperature colder than about −140° C. Vessel 718 is maintained at a temperature of about 20° C. to about −110° C., preferably from about −50° C. to about −110° C. Pressure gages 703 A, 704A, 712, 714 and 728 monitor pressure throughout the system. Conduit 710 is the manifold vacuum line. Conduits 722, 723, 727, and 724 are used to control the pressure in the reactor. Prior to operation, the system is purged with a flow of gas that is not reactive with the reagents such as hydrogen, nitrogen and helium or the like. The purge gas may enter the system through the ammonia or monohalosilane input lines or both. Once the system is purged, pressure in the system is reduced and controlled by opening valves 709, 720, 725 and 726 until the desired internal pressure in the reactor is achieved. Conduit 710 is a vacuum line when the reactor is being run at reduced pressure. Typically, the reactor is run at a pressure from about 100 torr to about 400 torr, preferably from about 200 torr to about 300 torr. The reactor may be run at ambient pressure if the reactor 711 and exit conduits 716 and 717 are heated sufficiently to keep the silylamine reaction products in the gas state.

Figure 8:
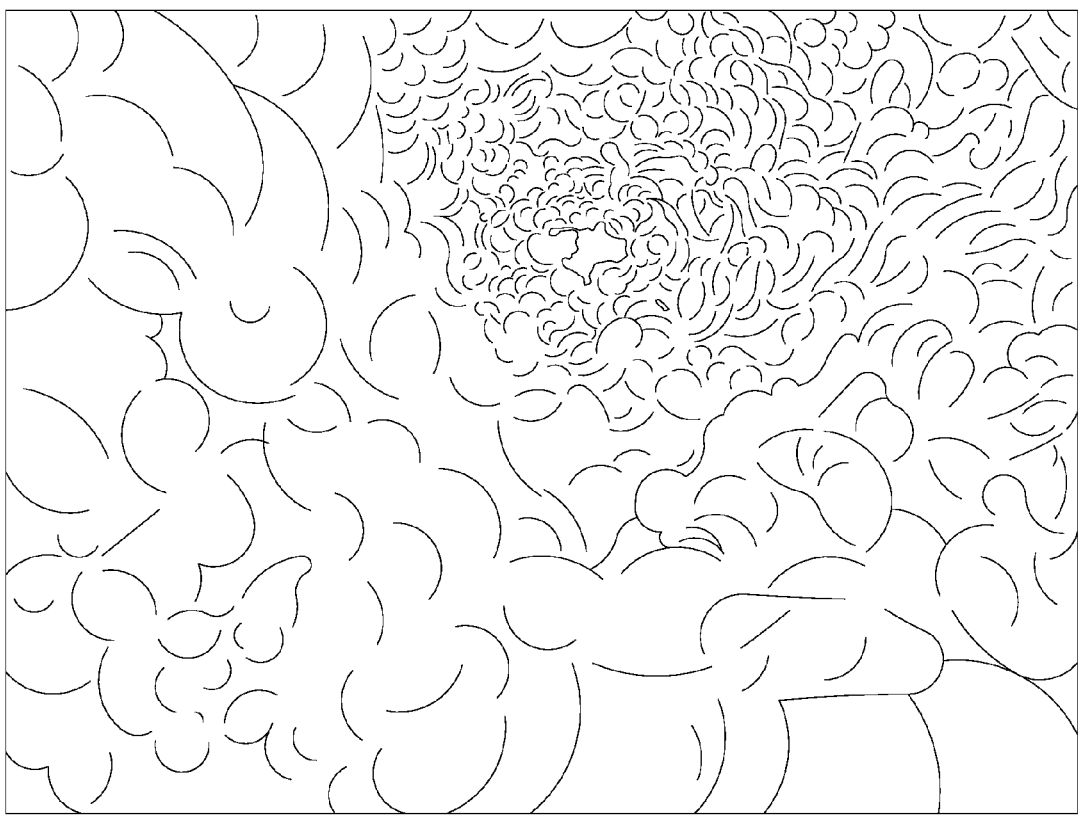
FIG. 8 is a photograph of the inside of the reaction zone after the process has been run.

FIG. 8 is a photograph of the inside of the reaction zone of the tubular reactor after a synthesis run to produce trisilylamine from ammonia and monochlorosilane. The photograph shows a deposit of crystalline ammonium chloride on the inside walls of the reaction zone.

The present invention is also directed to a process for preparing silylamines in a tubular laminar flow plug flow gas reactor comprising:

(a) directing a flow of a first reactant gas into the reaction zone of a tube reactor;

b) passing a second reactant gas through a conduit into the reaction zone of the tube reactor containing the first reactant gas thereby forming a laminar flow plug flow reaction stream wherein the first reactant gas and the second reactant gas react to form silylamines;

(c) passing the reaction stream containing silylamines into a collection zone;

(d) separating the silylamines from the reaction stream; and e) maintaining the reactor at a pressure of about one atmosphere or less.

Preferably maintaining the reactor internal pressure at about 100 torr to about 400 torr.

Ammonia and monohalosilane are metered into a vertical tubular reactor from the bottom. The gases are fed through different conduits to avoid premature reaction in the conduits. An excess of about 2 mole % to about 20 mole % of monohalosilane is normally used. The pressure is maintained at a value of about 100 to about 400 torr. If the reactor is heated, either externally or by capturing the heat of reaction, the pressure in the reactor may be raised accordingly. The boiling point of TSA is 52° C. at 1 atmosphere. Heating the reactor and outlet tubing to 60° C. would be sufficient to avoid TSA condensation in the reactor and outlet tubing when the reactor is run at 1 atmosphere. In addition, running the reactor at about 1 atmosphere, allows the TSA product to be in a collector vessel maintained at about 0° C. to about 20° C. The reaction is exothermic and hence the walls of the reactor get warm as the process progresses. The gases react to form substantially disilylamine and trisilylamine and ammonium halide. The waste product, ammonium halide, is a solid and partially sticks to the reactor walls or falls to the bottom of the reactor. Disilylamine and trisilylamine exit through the top of the reactor then move to a collection vessel, kept in a cold bath—dry ice/isopropyl alcohol (IPA) or liquid nitrogen (LN2). Disilylamine, trisilylamine and excess monohalosilane and any reaction by-products are collected in the collection vessel. It has been found that a slight excess of monohalosilane prevents or reduces formation of unwanted by-products such as higher molecular weight silazanes and silane. Upon standing in the receiver container, the condensed disilylamine produced in the reaction converts to trisilylamine. This conversion reaction is fast at temperatures at or above about 0° C., & is believed to proceed via:

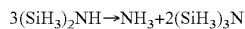

$$3(SiH_3)_2NH \rightarrow NH_3 + 2(SiH_3)_3N$$

Aylett and Hakim, Inorg. Chem., 1966, 5 (1), p 167, reported that in the gas state, at about 150° C. for 3 hours, DSA did not convert to TSA and that in the liquid state, at about 0° C. DSA converted to TSA in about 80% yield in 72 hours, Monohalosilanes useful in the present invention include monofluorosilane, monochlorosilane, monobromosilane and monoiodosilane. Monochlorosilane is preferred.

In an embodiment of the invention, ammonia and monochlorosilane (MCS) are metered into a vertical tubular reactor from the bottom. The gases are fed through different conduits and through different nozzles to avoid premature reaction in the delivery conduits. A slight excess of about 2 mole % to about 20 mole % of MCS is normally used. The pressure is maintained at a value below the room temperature vapor pressure of TSA (258 torr @ 20° C.) usually about 100 torr to about 200 torr. The gases react to form disilylamine, trisilylamine and ammonium chloride. The waste product, ammonium chloride, is a solid and effectively sticks to the reactor walls or falls to the bottom of the reactor. Disilylamine and trisilylamine exit through the top of the reactor to a collection vessel, kept in a cold bath—dry ice/isopropyl alcohol (IPA) or liquid nitrogen (LN2). The silylamines are collected in the receiver container. The reaction between ammonia and MCS is exothermic and hence the walls of the reactor get warm as the process progresses. It has been found that a slight stoichiometric excess of monohalosilane to ammonia prevents or reduces formation of unwanted by-products such as silazanes and silane. Preferably, the molar ratio of monohalosilane to ammonia is about 1 to about 1.2. The preferred monohalosilane is monchlorosilane.

Example 1

23 gm of Ammonia and 87 gm of monochlorosilane (MCS) are metered into a vertical tubular reactor from the bottom. The gases were fed through different lines and through different nozzles, as illustrated in FIGS. 1 and 7, to avoid premature reaction in the delivery lines. Ammonia was fed into the reactor at a rate of 0.38 gm/min. Monochlorosilane was fed into the reactor at a rate of 1.45 gm/min. This is an excess of about 29 mole % of MCS. The total run time was 60 minutes. The pressure in the reactor was maintained at about 100 to about 200 torr. The gases react to form disilylamine, trisilylamine and ammonium chloride. The reaction is exothermic and hence the walls of the reactor became warm as the process progressed. The gaseous reaction products exited through the top of the reactor to a collection vessel. The collection vessel is kept in a cold bath—dry ice/isopropyl alcohol (IPA) which creates a temperature of about −78° C. Disilylamine, trisilylamine are collected in the collection vessel. The yield of was greater than 95% of the theoretical.

Figure 9:
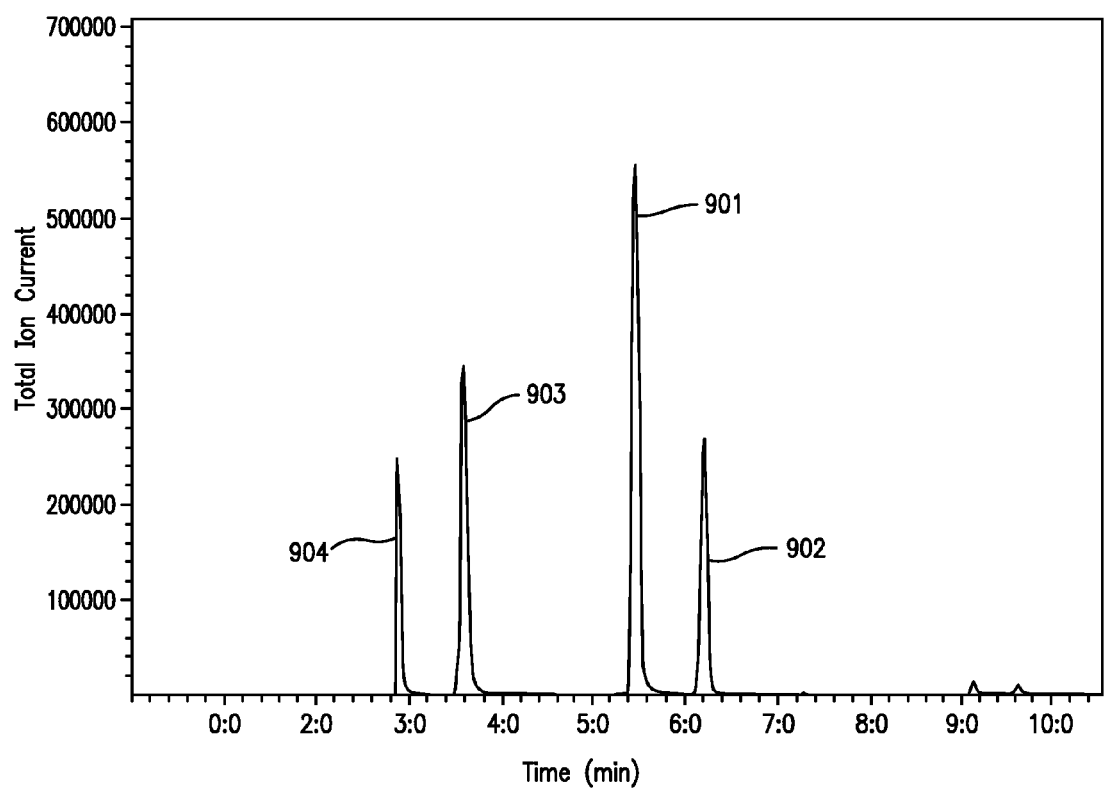
FIG. 9 is a gas chromatogram of the reaction product of the invention taken from the collection vessel when the vessel temperature was about −78° C.
Figure 10:
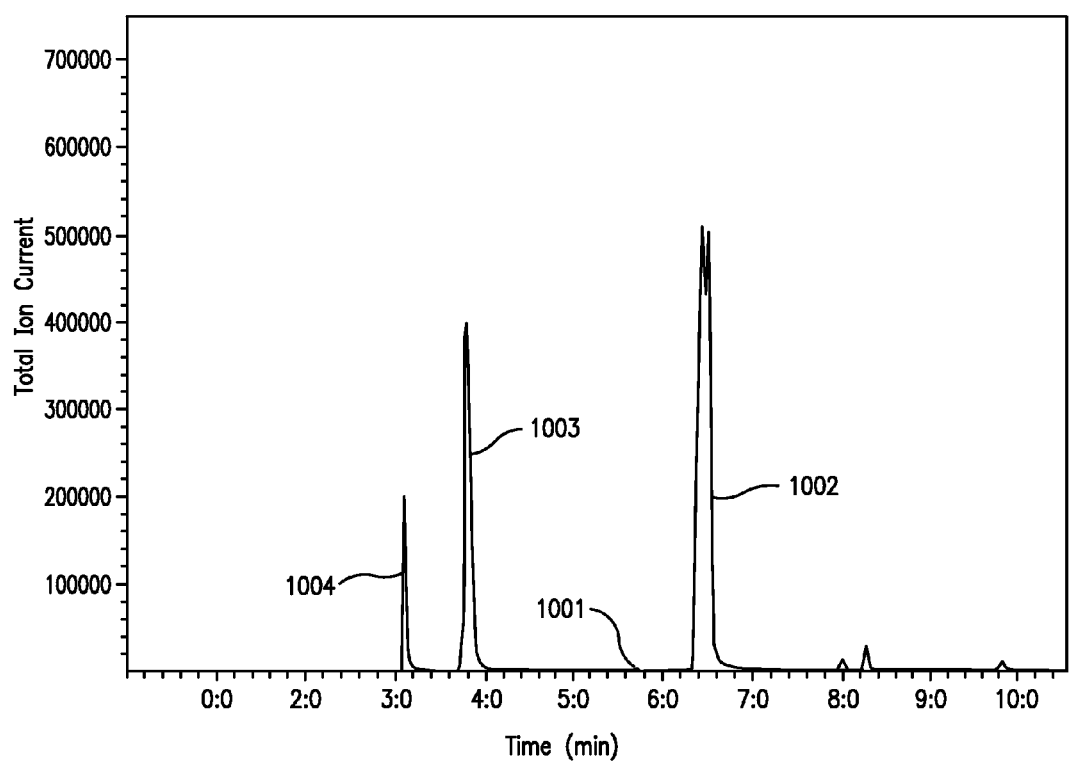
FIG. 10 is a gas chromatogram of the reaction product of the invention taken from the collection vessel when the vessel temperature was allowed to warm to about 20° C.

FIG. 9 is a chromatogram of the product in the gas flowing in the line between the reactor outlet and the cold trap inlet at 20 minutes after the start of the run described in Example 1. A large peak 901 of disilylamine can be seen at a retention time of about 5.5 minutes a much smaller peak 902 of trisilylamine can be seen at a retention time of about 6.2 minutes. Monochlorosilane 903, which was added in excess to the reactor, is at a retention time of about 3.6 minutes while silane, an impurity from MCS, is at a retention time of about 2.9 minutes. In FIGS. 9 and 10, time is increasing, left to right, on the X axis and detector response, Y axis, is increasing from bottom to top.

After the reaction was completed, the collection vessel was allowed to warm to about 20° C., this took 85 minutes, and a second chromatogram was then determined, FIG. 10. In the chromatogram of FIG. 10, only a trace of disilylamine 1001 (<0.1%), can be seen at a retention time of about 5.7 minutes a much larger peak 1002 of trisilylamine can be seen at a retention time of about 6.4 minutes. Monochlorosilane 1003, which was added in excess to the reactor, is at a retention time of about 3.8 minutes while silane, an impurity from MCS, is at a retention time of about 3.1 minutes. The appearance of the double peak of TSA is an artifact caused by detector saturation. The yield of Example 1 was greater than 95% of the theoretical.

The chromatograms of FIGS. 9 and 10 were determined under the following conditions:

Column: Rtx-1, 105 meter, 0.53 mm ID, 5 micron film.

Chromatograph: GC-MS system consisting of a Hewlett-Packard 5890 gas chromatograph using helium carrier gas and thermal conductivity and a Hewlett-Packard 5970 mass spectrometer.

Temperature program: 35 C/5 minutes initial hold time, 70 C/minute ramp, 175 C/10 minutes final hold time.

Sample introduction: 6-port Valco gas sample valve, 1 ml sample loop, sample pressure 50 torr.

Chromatograms, FIGS. 9 and 10, are plotted as increasing time from left to right and increasing total ion current increasing from bottom to top.

Example 2

139 gm of Ammonia and 450 gm of monochlorosilane (MCS) are metered into a vertical tubular reactor from the bottom. The gases were fed through different lines and through different nozzles, as illustrated in FIGS. 1 and 7, to avoid premature reaction in the delivery lines. Ammonia was fed into the reactor at a rate of 0.93 gm/min. Monochlorosilane was fed into the reactor at a rate of 3.0 gm/min. This is an excess of about 10.6 mole % of MCS. The total run time was 150 minutes. The pressure in the reactor was maintained at about 100 to about 200 torr. The gases react to form disilylamine, trisilylamine and ammonium chloride. The reaction is exothermic and hence the walls of the reactor became warm as the process progressed. The gaseous reaction products exited through the top of the reactor to a collection vessel. The collection vessel is kept in a cold bath—dry ice/isopropyl alcohol (IPA) which creates a temperature of about −78° C. Disilylamine, trisilylamine are collected in the collection vessel. The yield was greater than 95% of the theoretical.

Example 3

353 gm of Ammonia and 1063 gm of monochlorosilane (MCS) are metered into a vertical tubular reactor from the bottom. The gases were fed through different lines and through different nozzles, as illustrated in FIGS. 1 and 7, to avoid premature reaction in the delivery lines. Ammonia was fed into the reactor at a rate of 1.47 gm/min. Monochlorosilane was fed into the reactor at a rate of 4.43 gm/min. This is an excess of about 2.6 mole % of MCS. The total run time was 240 minutes. The pressure in the reactor was maintained at about 100 to about 200 torr. The gases react to form disilylamine, trisilylamine and ammonium chloride. The reaction is exothermic and hence the walls of the reactor became warm as the process progressed. The gaseous reaction products exited through the top of the reactor to a collection vessel. The collection vessel is kept in a cold bath—dry ice/isopropyl alcohol (IPA) which creates a temperature of about −78° C. Disilylamine, trisilylamine are collected in the collection vessel. The yield was greater than 95% of the theoretical.

The description of illustrative and preferred embodiments of the present invention is not intended to limit the scope of the invention. Various modifications, alternative constructions and equivalents may be employed without departing from the true spirit and scope of the appended claims.

I claim:

1. A tubular laminar flow plug flow gas reactor for synthesis of silylamines comprising: (a) a first portion of the tubular laminar flow reactor defining a gas entry zone, a second portion of the tubular laminar flow reactor defining a reaction zone and a third portion of the reactor defining a separation zone, the reaction zone providing a reactant contacting region; (b) one or more first conduits positioned substantially parallel to the central, longitudinal axis of the flow reactor extending into the gas entry zone and terminating in the reaction zone, the one or more conduits directing a laminar flow of a first reactant gas into the reaction zone; (c) one or more second gas entry conduits positioned upstream of the one or more first conduits directing a flow of a second reactant gas into the gas entry zone to form a flow of the second reactant gas which passes into the reaction zone; (d) the reaction zone wherein the first reactant gas and the second reactant gas come in contact with one another forming a reactant stream; (e) a filter positioned at the downstream end of the reaction zone; (f) a gas exit port directing the flow of the reactant stream from the reaction zone to a first collection zone; (g) the first collection zone comprising a first collector removing reaction product from the reactant stream.

2. The reactor of claim 1 wherein the reaction zone is cylindrical.

3. The reactor of claim 1 further comprising a second collection zone for removing products from the effluent stream of the first collector.

4. The reactor of claim 1 wherein the tubular flow reactor is positioned at an angle to horizontal from about 0 degrees to about 90 degrees.

5. The reactor of claim 4 wherein the tubular flow reactor is positioned at an angle to horizontal of about 85 degrees to about 90 degrees.

6. The reactor of claim 4 wherein the tubular flow reactor is positioned vertical.

7. The reactor of claim 1 further comprising a load lock gate valve upstream of the gas entry zone.

8. The reactor of claim 7 further comprising a solids accumulator upstream of the load lock gate valve.

9. The reactor of claim 1 wherein the first collector is a condensation trap having a temperature of about 20 deg C. to about −110 deg C. for removing silylamines from the reactant stream.

10. The reactor of claim 1 wherein the first collector is a condensation trap having a temperature of about −50 deg C. to about −110 deg C. for removing silylamines from the reactant stream.

11. The reactor of claim 1 wherein the reactor is heated.

12. The reactor of claim 3 wherein the second collection zone is a condensation trap having a temperature colder than about −140 deg C. for condensing waste products from the effluent stream of the first collector.

13. The reactor of claim 1 wherein the reaction zone is lined with glass.

14. The reactor of claim 1 wherein the reaction zone is lined with a non-stick material.

15. The reactor of claim 14 wherein the non-stick material is a fluoropolymer.

16. The reactor of claim 1 wherein the one first and one second conduits comprise concentric tubes wherein the second reactant gas flows in the outer concentric tube and the first reactant gas flows in the center tube.

17. The reactor of claim 1 wherein a plurality of first conduits is positioned substantially along the central, longitudinal axis of the flow reactor extending into the reactor and terminating in the reaction zone where each of the conduits is located sequentially down stream of each successive conduit, each of the plurality of conduits directing a flow of the first reactant gas into the reaction zone.

18. The reactor of claim 16 wherein the first reactant gas flows in the outer tube and the second reactant gas flows in the center tube of the concentric tubes.

19. A tubular laminar flow plug flow gas reactor for synthesis of trisilylamine comprising: (a) a first portion of the tubular laminar flow reactor defining a gas entry zone, a second portion of the tubular laminar flow reactor defining a reaction zone and a third portion of the reactor defining a separation zone, the reaction zone providing a reactant contacting region; (b) one or more conduits positioned substantially parallel to the central, longitudinal axis of the flow reactor extending into the gas entry zone and terminating in the reaction zone, the one or more conduits directing a laminar flow of a first reactant gas into the reaction zone; (c) one or more gas entry conduits positioned upstream of the one or more conduits directing a flow of a second reactant gas into the gas entry zone to form a flow of the second reactant gas which passes into the reaction zone; (d) the reaction zone wherein the first reactant gas and the second reactant gas come in contact with one another forming a reactant stream; (e) a filter positioned at the downstream end of the reaction zone; (f) a gas exit port directing the flow of the reactant stream from the reaction zone to a first collection zone; (g) the first collection zone comprising a first collector removing reaction product from the reactant stream; and wherein the internal reactor pressure is maintained at less than one atmosphere and the first reactant gas is ammonia and the second reactant gas is monochlorosilane.

20. The reactor of claim 19 further wherein a plurality of first conduits is positioned substantially along the central, longitudinal axis of the flow reactor extending into the reactor and terminating in the reaction zone where each of the conduits is located sequentially down stream of each successive conduit, the plurality of conduits directing a flow of the first reactant gas into the reaction zone.

21. The reactor of claim 19 further comprising a load lock gate valve upstream of the gas entry zone.

22. The reactor of claim 21 further comprising a solids accumulator upstream of the load lock gate valve.

23. The reactor of claim 19 wherein the first collector is a condensation trap having a temperature of 20 deg C. to about −110 deg C. for removing silylamines from the reactant stream.

24. The reactor of claim 19 wherein the first collector is a condensation trap having a temperature of −50 deg C. to about −110 deg C. for removing silylamines from the reactant stream.

25. The reactor of claim 19 wherein the reactor is heated.

26. The reactor of claim 19 wherein the reaction zone is cylindrical.

27. The reactor of claim 19 further comprising a second collector for removing waste products from the effluent stream of the first collector.

28. The reactor of claim 27 wherein the second collector is a condensation trap having a temperature colder than about −140 deg C. for condensing silane.

29. The reactor of claim 19 wherein the reaction zone is lined with glass.

30. The reactor of claim 19 wherein the reaction zone is lined with a non-stick material.

* * * * *